(12) United States Patent
Naito

(10) Patent No.: US 10,879,553 B2
(45) Date of Patent: Dec. 29, 2020

(54) FUEL CELL STACK

(71) Applicant: HONDA MOTOR CO., LTD., Tokyo (JP)

(72) Inventor: Hideharu Naito, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 50 days.

(21) Appl. No.: 15/886,943

(22) Filed: Feb. 2, 2018

(65) Prior Publication Data

US 2018/0226672 A1    Aug. 9, 2018

(30) Foreign Application Priority Data

Feb. 7, 2017   (JP) .................................. 2017-020254

(51) Int. Cl.

| | | |
|---|---|---|
| *H01M 8/2475* | (2016.01) | |
| *H01M 8/0273* | (2016.01) | |
| *H01M 8/1018* | (2016.01) | |
| *H01M 8/241* | (2016.01) | |
| *H01M 8/242* | (2016.01) | |

(52) U.S. Cl.
CPC ....... *H01M 8/2475* (2013.01); *H01M 8/0273* (2013.01); *H01M 8/1018* (2013.01); *H01M 8/241* (2013.01); *H01M 8/242* (2013.01); *H01M 2008/1095* (2013.01); *H01M 2250/20* (2013.01); *Y02T 90/40* (2013.01)

(58) Field of Classification Search
CPC .................................................. H01M 8/2475
See application file for complete search history.

(56) References Cited

U.S. PATENT DOCUMENTS

2015/0194696 A1    7/2015 Kim et al.

FOREIGN PATENT DOCUMENTS

| JP | 2011-171026 | 9/2001 | | |
|---|---|---|---|---|
| JP | 2005-538527 | 12/2005 | | |
| JP | 2006-236611 | 9/2006 | | |
| JP | 2006236611 A | * 9/2006 | .............. | H01M 8/10 |
| JP | 2007-128752 | 5/2007 | | |

(Continued)

OTHER PUBLICATIONS

TranslationOfJP2006236611A (Year: 2019).*

(Continued)

*Primary Examiner* — Brian R Ohara
(74) *Attorney, Agent, or Firm* — Amin, Turocy & Watson, LLP

(57) ABSTRACT

A fuel cell stack includes a casing which is formed by a combination of a plurality of plates; and a seal member interposed between the plurality of plates. The plurality of plates includes a pair of first plates facing each other in a first direction with the cell stacked body interposed therebetween, a pair of second plates facing each other in a second direction with the cell stacked body interposed therebetween, and a pair of third plates facing each other in a third direction with the cell stacked body interposed therebetween. The seal member has a frame seal which is formed in a frame shape extending to follow an outer circumferential portion of the first plate, an extension seal which extends in the first direction integrally with the frame seal, and a connection seal which is close to or in contact with the extension seals facing each other.

2 Claims, 6 Drawing Sheets

(56) References Cited

FOREIGN PATENT DOCUMENTS

| JP | 2007128752 A | * | 5/2007 | ............ H01M 8/04 |
|----|--------------|---|--------|------------------------|
| JP | 2013-152830  |   | 8/2013 |                        |
| JP | 2016-091940  |   | 5/2016 |                        |

OTHER PUBLICATIONS

TranslationOfJP2007128752A (Year: 2019).*
Definitions15886943 (Year: 2019).*
Definitions (Year: 2020).*
Japanese Notice of Allowance for Japanese Patent Application No. 2017-020254 dated Jun. 26, 2018.

* cited by examiner

FUEL CELL STACK

CROSS-REFERENCE TO RELATED APPLICATION

Priority is claimed on Japanese Patent Application No. 2017-20254, filed Feb. 7, 2017, the content of which is incorporated herein by reference.

BACKGROUND OF THE INVENTION

Field of the Invention

The present invention relates to a fuel cell stack.

Description of Related Art

A fuel cell stack to be mounted on a vehicle or the like has a cell stacked body, and a casing which houses the cell stacked body.

The cell stacked body is formed by stacking a plurality of unit cells. The unit cell includes a membrane-electrode assembly (hereinafter, simply referred to as MEA), and separators which sandwich the MEA. The MEA is formed by sandwiching a solid polymer electrolyte membrane from both sides with an anode electrode and a cathode electrode. In the fuel cell stack, hydrogen gas is supplied as fuel gas to the anode electrode, and air is supplied as oxidant gas to the cathode electrode. As a result, hydrogen ions generated by the catalytic reaction at the anode electrode move to the cathode electrode through the solid polymer electrolyte membrane, cause an electrochemical reaction with oxygen in the air at the cathode electrode, and power generation is performed.

The above-mentioned casing has a pair of end plates and a side plate. The pair of end plates sandwich the cell stacked body from both sides in a stacking direction. Side panels surround the periphery of the cell stacked body from a direction orthogonal to the stacking direction.

In the above-described fuel cell stack, various techniques have been studied in order to prevent leakage of the reactive gas present in the casing from unexpected places. For example, Japanese Unexamined Patent Application, First Publication No. 2013-152830 discloses a configuration in which a seal member is interposed between an end plate and a side panel or between adjacent side panels.

SUMMARY OF THE INVENTION

Incidentally, in the conventional fuel cell stack, there is still room for improvement in terms of improving the sealing properties of the casing. That is, in the conventional fuel cell stack, there is a possibility that the sealing properties of the mating surfaces of the seal member may not be sufficient.

Therefore, an aspect of the present invention has been made in view of the above-described circumstances, and an object thereof is to provide a fuel cell stack capable of improving sealing properties.

(1) To achieve the above object, a fuel cell stack according to an aspect of the present invention includes a cell stacked body in which a plurality of fuel cells are stacked; a casing which is formed by a combination of a plurality of plates and houses the cell stacked body; and seal members interposed between the plurality of plates. The plurality of plates includes a pair of first plates facing each other in a first direction with the cell stacked body interposed therebetween, a pair of second plates facing each other in a second direction orthogonal to the first direction with the cell stacked body interposed therebetween; and a pair of third plates facing each other in a third direction orthogonal to the first direction and the second direction with the cell stacked body interposed therebetween. The seal members include a frame seal portion which is formed in a frame shape extending to be aligned with an outer circumferential portion of the first plate, and is sandwiched between the first plate and the second plate and between the first plate and the third plate in the first direction, an extension seal portion which extends in the first direction integrally with the frame seal portion, and is sandwiched between the second plate and the third plate; and a connection seal portion which extends between the second plate and the third plate in the first direction, and is close to or in contact with the extension seal portions facing each other in the first direction.

(2) In the above aspect (1), the frame seal portion may be housed in a first housing groove formed on a surface of the second plate and the third plate which face the first plate, and the extension seal portion and the connection seal portion may be housed in a second housing groove formed on a surface of the second plate facing the third plate.

(3) In the above aspect (2), the extension seal portion and the connection seal portion may be connected by liquid packing, and at least one of the second plate and the third plate may be provided with a filling port for the liquid packing which communicates with the inside of the second housing groove.

(4) In one of the above aspects (1) to (3), the frame seal portion may be formed in a rectangular shape when seen from the first direction, and the extension seal portion may be formed at a position avoiding a corner portion of the frame seal portion.

According to the above aspect (1), since the seal members are interposed between the plates, it is possible to improve the sealing properties of the casing, and to prevent leakage of the reaction gas outside of the fuel cell stack.

In particular, since the extension seal portions are formed integrally with the frame seal portions in the seal members, the extension seal portions are disposed to straddle the boundary portions between the first plate and the second plate and between the first plate and the third plate. That is, it is possible to shift the positions of the boundary portion between the plates, and the connecting portion of the seal members. Therefore, it is possible to prevent the reaction gas from leaking outside through the connecting portion of the seal members (the boundary portion between the extension seal and the connection seal portion).

According to the above aspect (2), since a seal member is housed in each of the housing grooves, displacement of the seal member can be suppressed. Therefore, the seal member can be disposed at a desired position, and the sealing properties can be secured.

According to the above aspect (3), by filling the liquid packing into the second housing groove through the filling ports, the extension seal portions and the connection seal portion can be joined by the liquid packing. Therefore, it is possible to improve the sealing properties at the boundary portion between the extension seal portions and the connection seal portion.

Further, since the liquid packing can be filled in after each plate is assembled, the seal members can be divided into the frame seal portions, the extension seal portions, and the connection seal portion. Accordingly, it is possible to improve the assembling efficiency as compared with the case of assembling integrally formed seal members.

According to the above aspect (4), as compared with the case where the extension seal portions are positioned at the corner portions, it is possible to reduce stress concentration at the boundary portion between the extension seal portions and the frame seal portions. As a result, it is possible to prevent rupturing or the like of the extension seal portions and improve the durability.

DETAILED DESCRIPTION OF THE INVENTION

Next, an embodiment of the present invention will be described on the basis of the drawings.

[Fuel Cell Stack]

Figure 1:
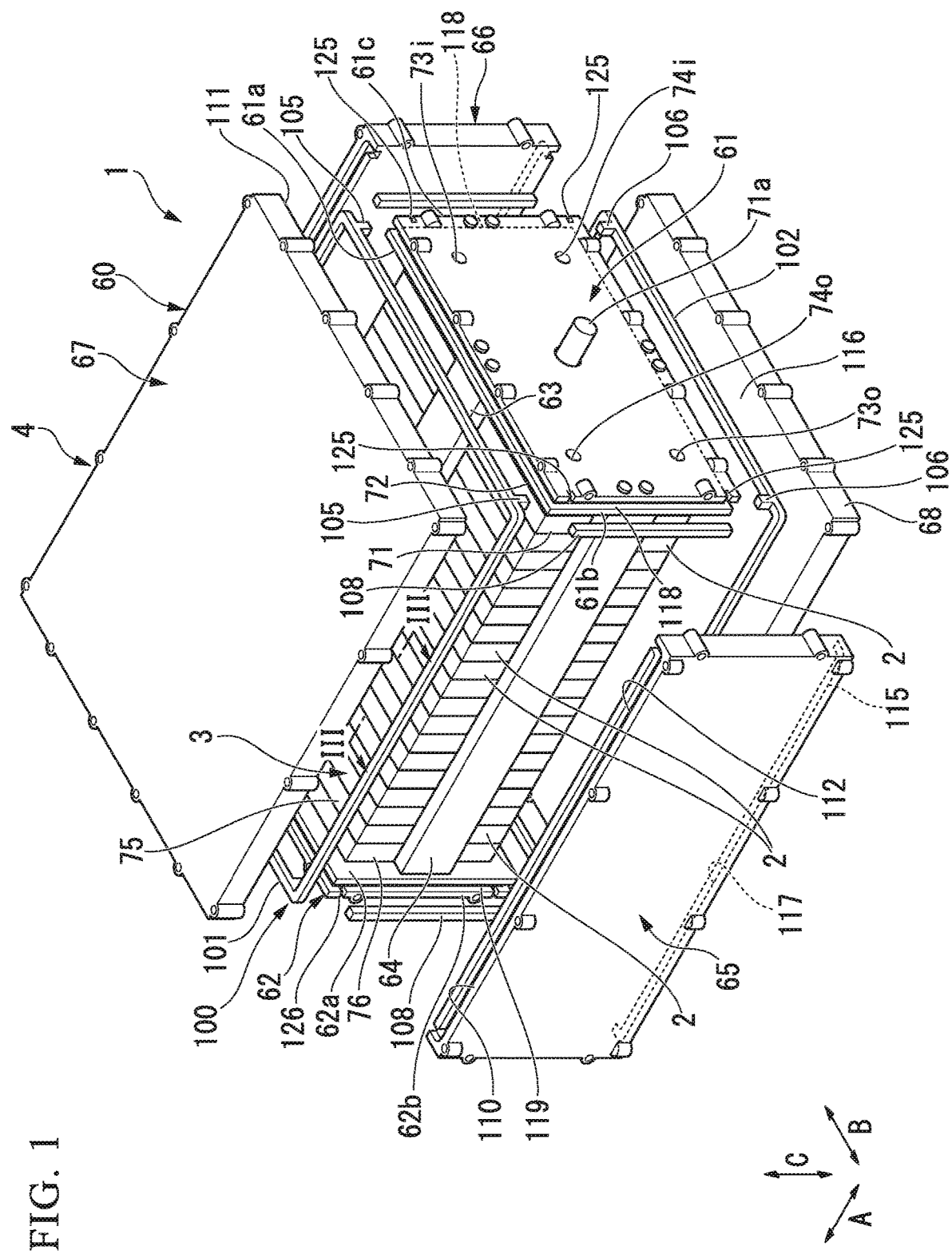
FIG. 1 is an exploded perspective view of a fuel cell stack according to a first embodiment which is seen from a first end plate side.

FIG. 1 is an exploded perspective view of a fuel cell stack 1 of this embodiment which is seen from a first end plate 61 side.

As shown in FIG. 1, the fuel cell stack 1 of this embodiment is mounted in a motor compartment that is formed at the front of a vehicle (not shown). The fuel cell stack 1 is used, for example, to supply power to a driving motor or a battery. The fuel cell stack 1 of this embodiment is mounted on the vehicle such that, for example, a direction A (a first direction) of FIG. 1 is aligned with a width direction of the vehicle, a direction B (a third direction) follows a front-rear direction of the vehicle, and a direction C (a second direction) of the vehicle follows a vertical direction.

The fuel cell stack 1 is mainly provided with a cell stacked body 3, and a casing 4 that houses the cell stacked body 3.

The cell stacked body 3 has a configuration in which a plurality of unit cells (fuel cells) 2 are stacked in the direction A. In the following description, for the above-mentioned direction A, direction B, and direction C, in some cases, the direction of approaching the central portion of the stacked body 3 is referred to as to the inside, and the direction of moving away from the central portion of the cell stacked body 3 is referred to as to the outside.

<Unit Cell>

Figure 2:
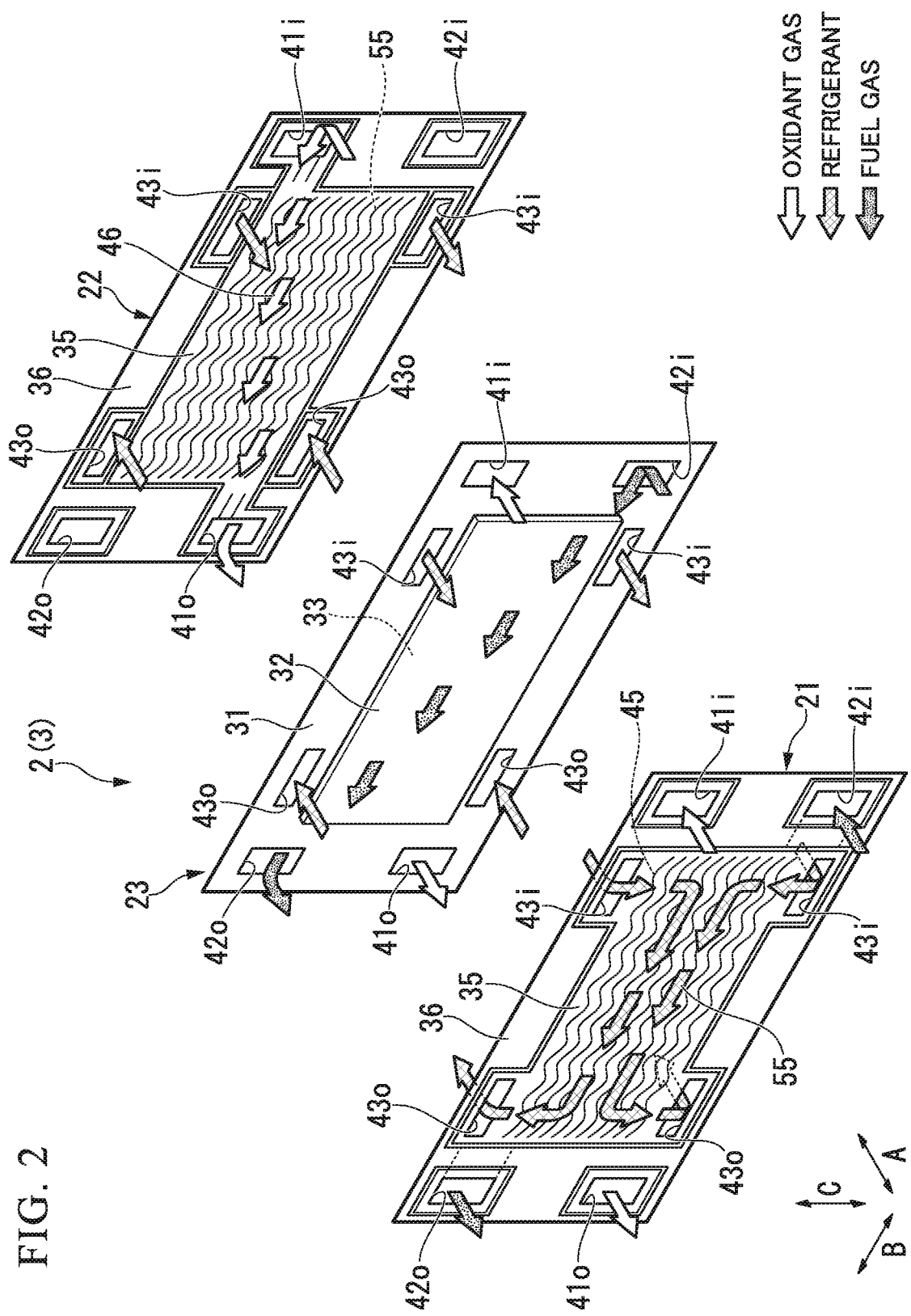
FIG. 2 is an exploded perspective view of a unit cell shown in FIG. 1.

FIG. 2 is an exploded perspective view of the unit cell 2.

As shown in FIG. 2, the unit cell 2, for example, is equipped with a pair of separators 21 and 22, and a MEA 23 sandwiched between the respective separators 21 and 22. The MEA 23 is equipped with a solid polymer electrolyte membrane 31, and an anode electrode 32 and a cathode electrode 33 that sandwich the solid polymer electrolyte membrane 31 from both sides in the direction A.

The anode electrode 32 and the cathode electrode 33 have a gas diffusion layer (e.g., carbon paper or the like), and an electrode catalyst layer that is formed by uniformly applying porous carbon particles with a platinum alloy held on the surface to the surface of the gas diffusion layer.

The solid polymer electrolyte membrane 31, for example, is formed of a material in which perfluorosulfonic acid polymer is impregnated with water. The solid polymer electrolyte membrane 31 has an external shape in a front view as seen in the direction A that is larger than that of the anode electrode 32 and cathode electrode 33. In the example of FIG. 2, the anode electrode 32 and the cathode electrode 33 stack each other in the central portion of the solid polymer electrolyte membrane 31. The outer circumferential portion of the solid polymer electrolyte membrane 31 protrudes from other end of the anode electrode 32 and the cathode electrode 33 in a frame shape.

Respectively, the separators 21 and 22 of the unit cell 2 are a first separator 21 that faces the anode electrode 32 of the MEA 23, and a second separator 22 that faces the cathode electrode 33 of the MEA 23. In the following description, in each of the separators 21 and 22, the same components will be collectively described by being denoted by the same reference numerals.

Each of the separators 21 and 22 has a separator plate 35, and a covering member 36 that covers the outer circumferential portion of the separator plate 35.

The separator plate 35 is made of, for example, a metal plate or a carbon plate. Specifically, in a front view, the separator plate 35 is formed in a rectangular shape having the direction B as a longitudinal direction. In the example of FIG. 2, the separator plate 35 is formed with the same external shape as the solid polymer electrolyte membrane 31 when seen from the front. The separator plate 35 overlaps the MEA 23 when seen from the direction A.

Figure 3:
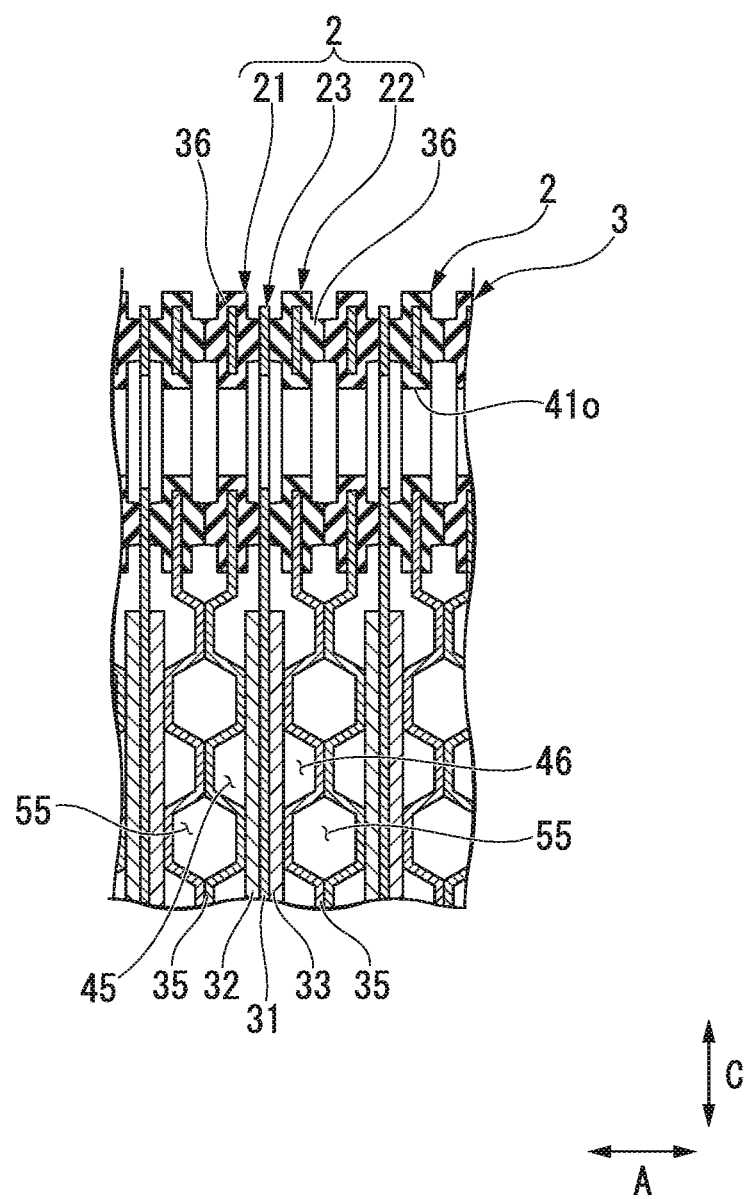
FIG. 3 is a cross-sectional view corresponding to line of FIG. 1.

FIG. 3 is a cross-sectional view corresponding to line of FIG. 1.

As shown in FIG. 3, the covering member 36 is formed from an elastically deformable material (e.g., rubber or the like). The covering member 36 is in close contact with the outer circumferential portion of the solid polymer electrolyte membrane 31 in the direction A.

As shown in FIG. 2, in each corner portion of the unit cell 2, inlet gas communication holes (an oxidant gas inlet communication hole 41$i$ and a fuel gas inlet communication hole 42$i$), and outlet gas communication holes (an oxidant gas outlet communication hole 41$o$ and a fuel gas outlet communication hole 42$o$) are formed. Each of the communication holes 41$i$, 41$o$, 42$i$ and 42$o$ passes through the unit cell 2 in the direction A.

In the example shown in FIG. 2, an oxidant gas inlet communication hole 41$i$ is formed in the right upper corner portion of the unit cell 2. The oxidant gas (e.g., air or the like) supplied to the cathode electrode 33 flows through the oxidant gas inlet communication hole 41$i$.

A fuel gas inlet communication hole 42$i$ is formed in a right lower corner portion of the unit cell 2. The fuel gas (e.g., hydrogen or the like) supplied to the anode electrode 32 flows through the fuel gas inlet communication hole 42$i$.

An oxidant gas outlet communication hole 41$o$ is formed in a left lower corner portion of the unit cell 2. The spent oxidant gas having passed through the cathode electrode 33 flows through the oxidant gas outlet communication hole 41$o$.

The fuel gas outlet communication hole 42$o$ is formed in the left upper corner portion of the unit cell 2. The spent fuel gas having passed through the anode electrode 32 flows through the fuel gas outlet communication hole 42$o$.

In the unit cell 2, a coolant inlet communication hole 43$i$ is formed at a portion located inside each of the inlet communication holes 41$i$ and 42$i$ in the direction B.

In the unit cell 2, a coolant outlet communication hole 43o is formed at a portion located inside each of the outlet communication holes 41o and 42o in the direction B. A pair of coolant inlet communication holes 43i and a pair of coolant outlet communication holes 43o are disposed at positions facing each other in the direction C, while the anode electrode 32 and the cathode electrode 33 are interposed therebetween.

The central portions of each of the separators 21 and 22 (the separator plate 35) have a concave-convex shape by press forming or the like. Gas flow passages 45 and 46 are formed between the surfaces of the separators 21 and 22 facing the MEA 23 in the direction A, and the MEA 23.

Specifically, the fuel gas flow passage 45 is formed between the surface of the first separator 21 facing the anode electrode 32 and the anode electrode 32 of the MEA 23. The fuel gas flow passage 45 communicates with each of the fuel gas inlet communication hole 42i and the fuel gas outlet communication hole 42o.

An oxidant gas flow passage 46 is formed between the surface of the second separator 22 facing the cathode electrode 33 and the cathode electrode 33 of the MEA 23. The oxidant gas flow passage 46 communicates with each of the oxidant gas inlet communication hole 41i and the oxidant gas outlet communication hole 41o.

As shown in FIG. 3, the cell stacked body 3 is configured so that the first separator 21 of one unit cell 2 and the second separator 22 of another unit cell 2 adjacent to the one unit cell 2 are stacked in the direction A in an stackping state. A coolant flow passage 55 is formed between the first separator 21 of the one unit cell 2 and the second separator 22 of the other unit cell 2. As shown in FIG. 2, the coolant flow passage 55 communicates with each of the coolant inlet communication holes 43i and the coolant outlet communication holes 43o. As the coolant flowing through the coolant flow passage 55, for example, pure water, ethylene glycol or the like is preferably used.

The stacked structure of the unit cells 2 is not limited to the above-described configuration. For example, the unit cell may be made up of three separators and two MEAs interposed between the respective separators. It is also possible to appropriately change the design of the layout of the respective communication holes.

<Casing>

As shown in FIG. 1, the casing 4 is formed in a box shape having a size larger than the cell stacked body 3. Specifically, the casing 4 has a first end plate 61, a second end plate 62, a first coupling bar 63, a second coupling bar 64, and side panels 60. The first end plate 61 and the second end plate 62 sandwich the cell stacked body 3 from both sides in the direction A. The first coupling bar 63 and the second coupling bar 64 individually couple the sides of the end plates 61 and 62 facing each other in the direction A. The side panels 60 include four plates 65 to 68 which surround the periphery of the cell stacked body 3.

The end plates (second plates) 61 and 62 are formed in a rectangular shape having an external shape in a front view larger than the unit cell 2. The first end plate 61 is disposed outside the cell stacked body 3 in the direction A, in the state of sandwiching the first terminal plate 71 and the first insulator 72 between the first end plate 61 and the cell stacked body 3. An output terminal 71a protruding outward from the first terminal plate 71 in the direction A passes through the first end plate 61 in the direction A.

The first end plate 61 has gas inlet holes (an oxidant gas inlet hole 73i and a fuel gas inlet hole 74i) and gas outlet holes (an oxidant gas outlet hole 73o and a fuel gas outlet hole 74o) passing through the first end plate 61 in the direction A formed therein. The oxidant gas inlet hole 73i communicates with the oxidant gas inlet communication hole 41i (see FIG. 2) through an oxidant gas inlet connection hole (not shown) formed in the first terminal plate 71 and the first insulator 72. The fuel gas inlet hole 74i communicates with the corresponding fuel gas inlet communication hole 42i (see FIG. 2) through a fuel gas inlet connection hole (not shown) formed in the first terminal plate 71 and the first insulator 72.

The oxidant gas outlet hole 73o communicates with the above-described oxidant gas communication hole 41o (see FIG. 2) through the oxidant gas outlet connection hole (not shown) formed in the first terminal plate 71 and the first insulator 72. The fuel gas outlet hole 74o communicates with the corresponding fuel gas communication hole 42o (see FIG. 2) through the fuel gas outlet connection hole (not shown) formed in the first terminal plate 71 and the first insulator 72.

Figure 4:
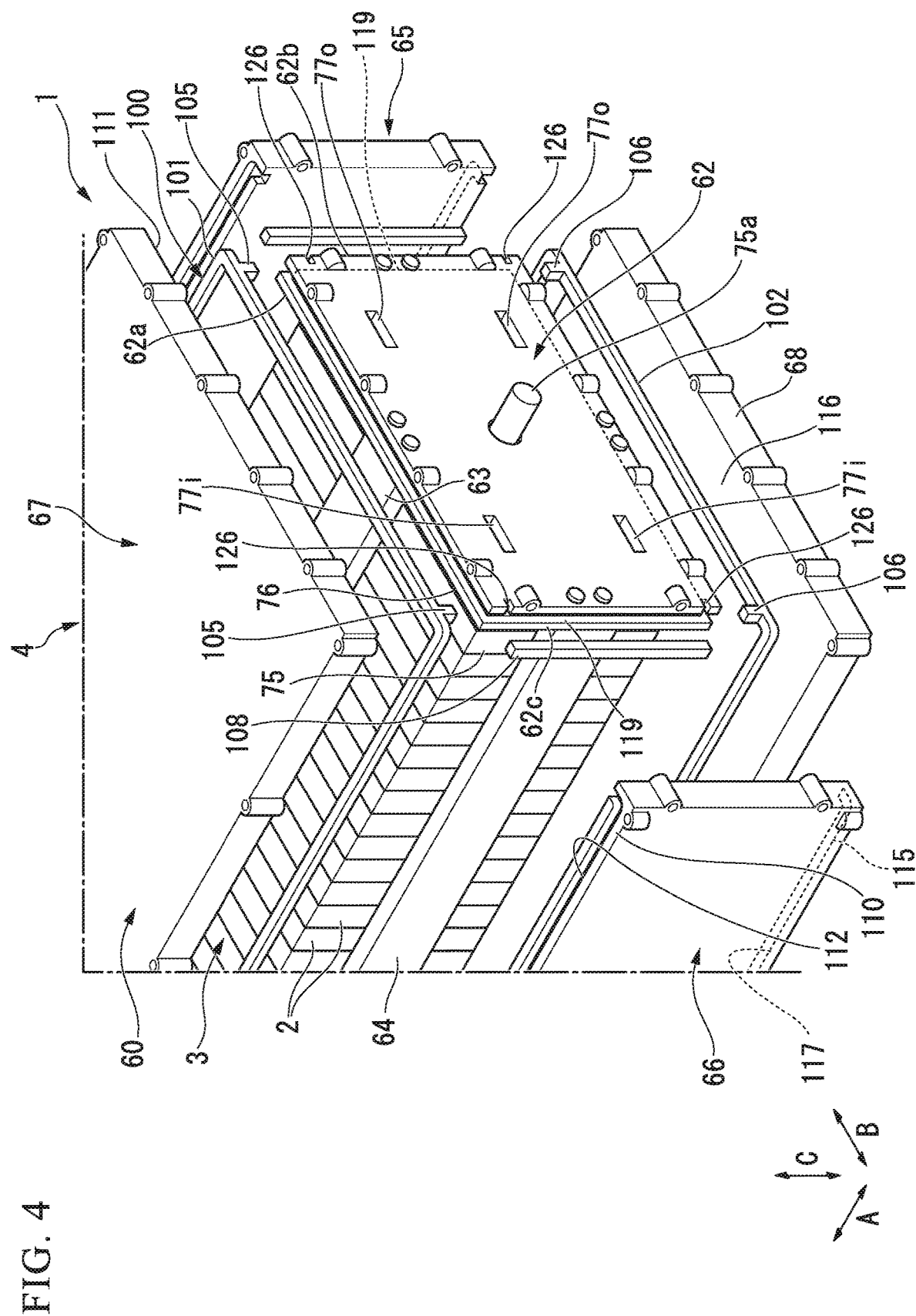
FIG. 4 is an exploded perspective view of the fuel cell stack of the first embodiment which is seen from a second end plate side.

FIG. 4 is an exploded perspective view of the fuel cell stack 1 which is seen from the second end plate 62 side.

As shown in FIG. 4, in a state in which the second terminal plate 75 and the second insulator 76 are sandwiched between the second end plate 62 and the cell stacked body 3, the second end plate 62 is disposed on the outer side of the cell stacked body 3 in the direction A. An output terminal 75a protruding outward from the second terminal plate 75 in the direction A passes through the second end plate 62 in the direction A.

A coolant inlet hole 77i and a coolant outlet hole 77o are formed in the second end plate 62 to pass through the second end plate 62 in the direction A. The coolant inlet hole 77i communicates with the coolant inlet communication hole 43i (see FIG. 2) through a coolant inlet connection hole (not shown) formed in the second terminal plate 75 and the second insulator 76. The coolant outlet hole 77o communicates with the coolant outlet communication hole 43o (see FIG. 2) through a coolant outlet connection hole (not shown) formed in the second terminal plate 75 or the second insulator 76.

The first coupling bar 63 and the second coupling bar 64 are formed in a plate shape extending along the direction A. The respective coupling bars 63 and 64 are fastened to each of the end plates 61 and 62, for example, with screws, in a state in which both end surfaces in the direction A abut the inner end surfaces 61a and 62a in the direction A of the end plates 61 and 62, respectively. Specifically, the first coupling bars 63 couple the long side portions of the end plates 61 and 62 on both sides in the direction C with respect to the cell stacked body 3. The second coupling bars 64 couple the short side portions of the end plates 61 and 62 on both sides in the direction B with respect to the cell stacked body 3. The cross-sectional shapes of each of the coupling bars 63 and 64 can be appropriately changed, such as to a rectangular shape and a circular shape.

The side panels 60 surround the cell stacked body 3, the end plates 61 and 62, the coupling bars 63 and 64, the terminal plates 71 and 75, and the insulators 72 and 76 from the outside in the direction B and the outside in the direction C.

The side panels 60 include a plurality of (four) plates 65 to 68 disposed to correspond to each side of the end plates 61 and 62. The plates 65 to 68 of this embodiment are a front plate (a third plate) 65, a rear plate (a third plate) 66, an upper plate (a first plate) 67 and a lower plate (a first plate) 68. In the following description, it is assumed that, with respect to the cell stack 3, the direction toward the front plate 65 is set as a forward, and the direction toward the rear plate 66 is set as a rearward. Further, it is assumed that, with respect to the cell stacked body 3, the direction toward the upper plate 67 is set as an upward, and the direction toward the lower plate 68 is set as a downward.

In the side panels 60, the adjacent plates 65 to 68 are fastened to each other to form a square tube shape. Both end portions of each of the plates 65 to 68 in the direction A are fastened to the end plates 61 and 62, for example, with screws. Therefore, the aforementioned cell stacked body 3, the terminal plates 71 and 75, the insulators 72 and 76, and the like are housed in a space defined by the side panels 60 and the end plates 61 and 62.

Here, seal members 100 are interposed between the end plates 61 and the side panels 60, between the end plates 62 and the side panels 60, and between the respective plates 65 to 68 of the side panels 60. The seal members 100 include frame seal portions (an upper frame seal portion 101 and a lower frame seal portion 102), extension seal portions (an upper extension seal portion 105 and a lower extension seal portion 106), and connection seal portions 108. The seal member 100 is made of an elastically deformable material (e.g., rubber or the like). The cross-sectional shape of the seal member 100 can be appropriately changed, such as to a rectangle or a circle.

The upper frame seal portion 101 is disposed between the respective upper surfaces (hereinafter, collectively referred to as an upper frame surface (facing surface) 110) of the end plates 61 and 62, the front plate 65 and the rear plate 66, and a lower surface (facing surface) 111 of the upper plate 67. The upper frame seal portion 101 is formed in a rectangular frame shape formed to follow the outer circumferential portion of the upper plate 67. In this embodiment, the external shape of the upper frame seal portion 101 is smaller than the external shape of the upper plate 67. Further, each corner portion (a boundary portion between the long side portion and the short side portion) of the upper frame seal portion 101 may be formed in a curved shape.

The upper frame seal portion 101 is housed in an upper frame housing groove (first housing groove) 112 formed in the upper frame surface 110. The depth of the upper frame housing groove 112 in the direction C is set to be less than the thickness of the upper frame seal portion 101 in the direction C. The upper frame housing groove 112 is formed in a frame shape that extends to follow the upper frame surface 110 in a plan view which is seen from the direction C. That is, the upper frame housing groove 112 is connected between the end plates 61 and 62, the front plate 65, and the rear plate 66. In this embodiment, each corner portion of the upper frame housing groove 112 is located on the upper surface of one of the front plate 65 and the rear plate 66. Each corner portion of the upper frame housing groove 112 may be formed in a curved shape.

Figure 5:
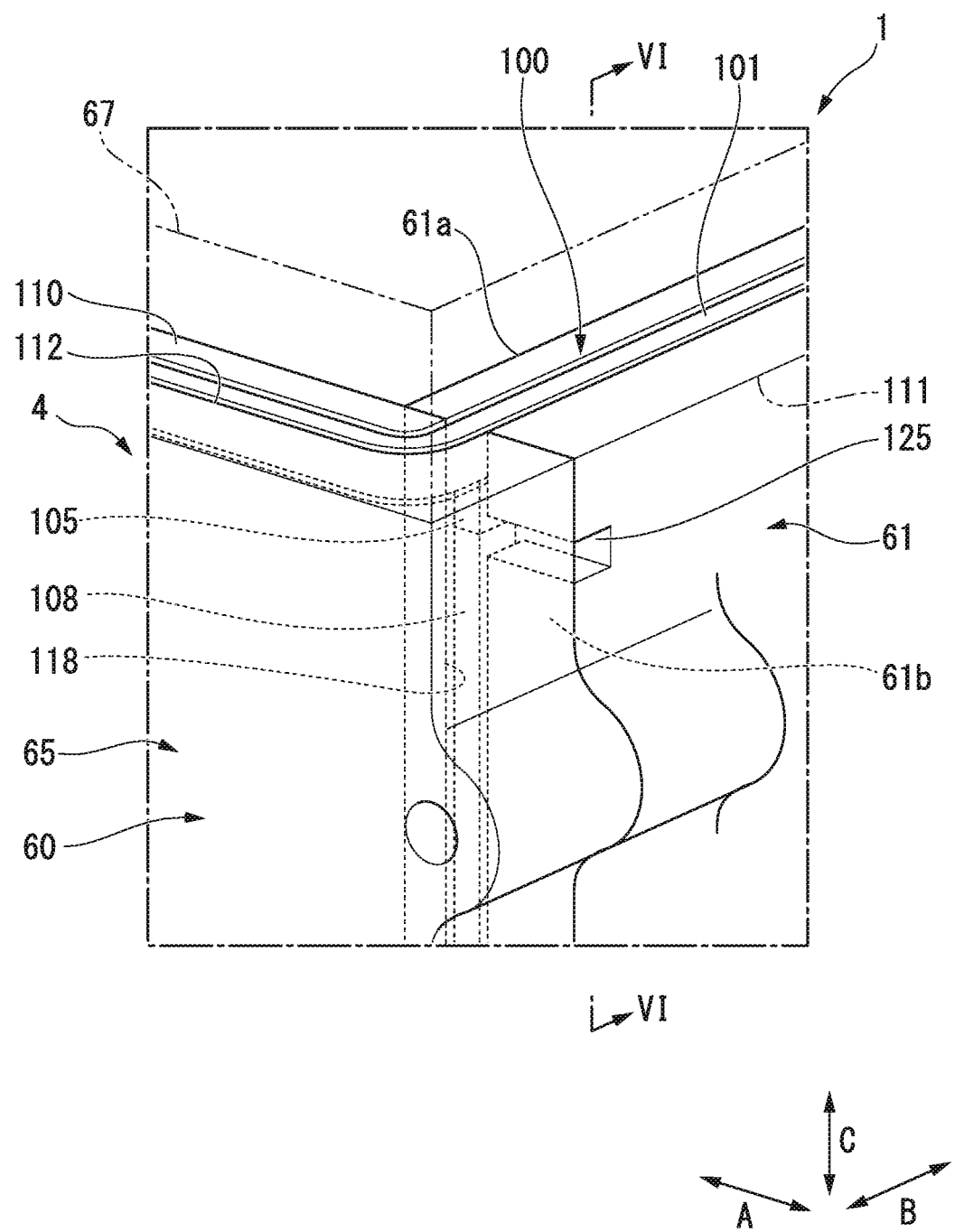
FIG. 5 is an enlarged perspective view of the casing.

FIG. 5 is an enlarged perspective view of the casing 4.

As shown in FIG. 5, the lower surface 111 of the upper plate 67 and the upper frame surface 110 are made to abut each other in the direction C. Thus, the upper frame seal portion 101 is sandwiched in the direction C between the upper frame surface 110 and the lower surface 111 in a state of being housed in the upper frame housing groove 112. In this embodiment, on the lower surface 111 of the upper plate 67, a portion facing the upper frame housing groove 112 in the direction C is formed as a flat surface.

As shown in FIG. 4, the lower frame seal portion 102 is disposed between each lower surface (hereinafter, collectively referred to as a lower frame surface (a facing surface) 115) of the end plates 61 and 62, the front plate 65 and the rear plate 66, and an upper surface (a facing surface) 116 of the lower plate 68. Further, the lower frame seal portion 102 has the same external shape as that of the upper frame seal portion 101.

The lower frame seal portion 102 is housed in a lower frame housing groove (first housing groove) 117 formed in the lower frame surface 115. Since the lower frame housing groove 117 is configured to be plane-symmetrical with the upper frame housing groove 112, a description thereof will be appropriately omitted.

The upper surface 116 of the lower plate 68 and the lower frame surface 115 are made to abut on each other in the direction C. Thus, the lower frame seal portion 102 is sandwiched between the lower frame surface 115 and the upper surface 116 of the lower plate 68 in the direction C, in a state of being housed in the lower frame housing groove 117. In this embodiment, on the upper surface 116 of the lower plate 68, a portion facing the lower frame housing groove 117 in the direction C is formed as a flat surface.

Figure 6:
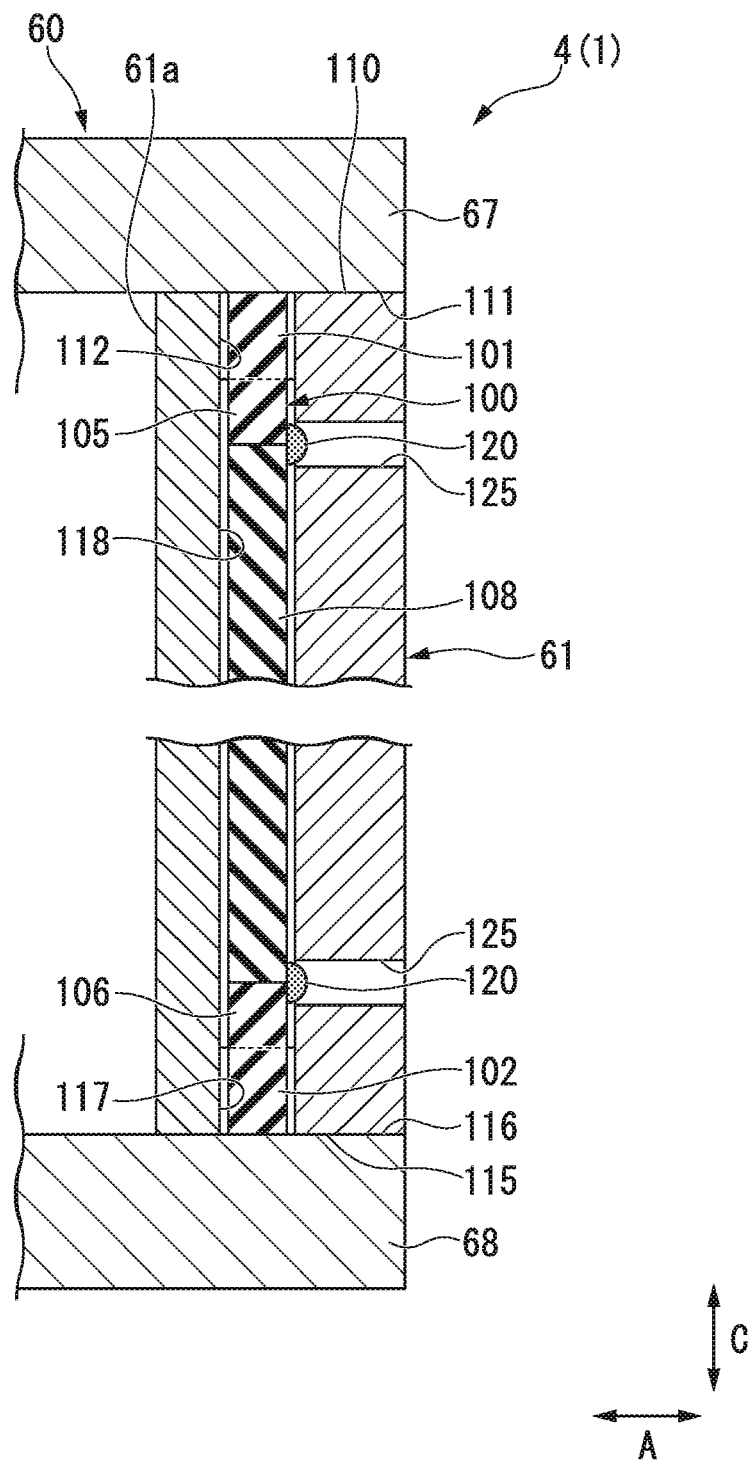
FIG. 6 is a cross-sectional view corresponding to line VI-VI of FIG. 5.

FIG. 6 is a cross-sectional view corresponding to the line VI-VI of FIG. 5.

As shown in FIGS. 1, 5, and 6, a first connection groove (a second housing groove) 118 is formed on the front surface 61b and the rear surface 61c of the first end plate 61. The first connection groove 118 is recessed inside in the direction B from the front surface 61b and the rear surface 61c in the first end plate 61. The first connection groove 118 extends linearly over the entire length of the first end plate 61 in the direction C. The upper end opening portion of the first connection groove 118 communicates with the inside of the above-mentioned upper frame housing groove 112. The lower end opening portion of the first connection groove 118 communicates with the inside of the above-described lower frame housing groove 117.

As shown in FIGS. 4 and 6, a second connection groove (a second housing groove) 119 is formed on the front surface 62b and the rear surface 62c of the second end plate 62. The second connection groove 119 is recessed inside in the direction B from the front surface 62b and the rear surface 62c of the second end plate 62. The second connection groove 119 extends linearly over the entire length of the second end plate 62 in the direction C. The upper end opening portion of the second connection groove 119 communicates with the above-described upper frame housing groove 112. The lower end opening portion of the second connection groove 119 communicates with the inside of the aforementioned lower frame housing groove 117. Each of the connection grooves 118 and 119 is not limited to a linear shape as long as the connection grooves 118 and 119 communicate with the housing grooves 112 and 117.

As shown in FIGS. 1 and 4, the above-described upper extension seal portion 105 is formed integrally with the upper frame seal portion 101. The upper extension seal portion 105 extends downward from each vicinity of each corner portion of the upper frame seal portion 101. Specifically, the upper extension seal portions 105 are formed at both end portions in the direction B (a portion located on the inner side in the direction B of each corner portion) in each short side portion (a portion extending in the direction B) of the upper frame seal portion 101, respectively. Each of the upper extension seal portions 105 is housed in the corresponding connection grooves 118 and 119, respectively.

The lower extension seal portion 106 is integrally formed with the lower frame seal portion 102. The lower extension seal portion 106 is formed at each of both end portions in the direction B at each short side portion (a portion extending in the direction B) of the lower frame seal portion 102. Each lower extension seal portion 106 extends upward from the lower frame seal portion 102. Each lower extension seal portion 106 is housed in the corresponding connection grooves 118 and 119, respectively. The thickness of each of the extension seal portions 105 and 106 in the direction B is larger than the depth of each of the connection grooves 118 and 119 in the direction B. The extension seal portions 105 and 106 may be connected to the long side portions of the frame seal portions 101 and 102 or may be connected to the corner portions. Further, the length of each of the extension seal portions 105 and 106 in the direction C can be appropriately changed.

The connection seal portion 108 is housed in each of the connection grooves 118 and 119. Each connection seal portion 108 is positioned between the upper extension seal portion 105 and the lower extension seal portion 106 in each of the connection grooves 118 and 119. Specifically, the upper end surface of the connection seal portion 108 is close to or in contact with the lower end surface of the upper extension seal portion 105 in the direction C. The lower end surface of the connection seal portion 108 is close to or in contact with the upper end surface of the lower extension seal portion 106 in the direction C. That is, the upper end surface of the connection seal portion 108 bridges over the lower end surface of the upper extension seal portion 105 and the upper end surface of the lower extension seal portion 106 in the direction C. The cross-sectional shape of the connection seal portion 108 is substantially the same as the cross-sectional shape of the above-described extension seal portions 105 and 106. That is, the thickness of the connection seal portion 108 in the direction B is larger than the depths of the connection grooves 118 and 119. However, the cross-sectional shape of the connection seal portion 108 may be different from those of the extension seal portions 105 and 106. Further, the material of the connection seal portion 108 may be the same as or different from the material of the extension seal portions 105 and 106.

The first end plate 61 and the front plate 65 are made to abut on each other in the direction B, and the first end plate 61 and the rear plate 66 are made to abut on each other in the direction B. As a result, the respective extension seal portions 105 and 106 and the connection seal portion 108 housed in the first connection groove 118 are interposed between the first end plate 61 and the front plate 65, and between the first end plate 61 and the rear plate 66, respectively.

The second end plate 62 and the front plate 65 are made to abut on each other in the direction B, and the second end plate 62 and the rear plate 66 are made to abut on each other in the direction B. As a result, each of the extension seal portions 105 and 106 and the connection seal portion 108 housed in the second connection groove 119 are interposed between the second end plate 62 and the front plate 65, and between the second end plate 62 and the rear plate 66, respectively.

In this embodiment, in the front plate 65 and the rear plate 66, portions facing the connection grooves 118 and 119 in the direction B are formed as flat surfaces.

As shown in FIG. 6, the upper end portion of the connection seal portion 108 and the lower end portion of the upper extension seal portion 105 are joined to each other by a packing 120. The lower end portion of the connection seal portion 108 and the upper end portion of the lower extension seal portion 106 are joined to each other by a packing 120. The packing 120 is, for example, a silicon-based liquid packing. The application range of the packing 120 can be appropriately changed, as long as the packing 120 joins at least a boundary portion between the connection seal portion 108 and each of the extension seal portions 105 and 106.

In the first end plate 61, a first filling port 125 through which the inside and the outside of the first connection groove 118 communicate with each other is formed at the position in the direction C corresponding to the boundary portion between each of the extension seal portions 105 and 106 and the connection seal portion 108. In this embodiment, the first filling port 125 is located at both end portions of the first connection groove 118 in the direction C, respectively. Each of the first filling ports 125 is recessed inside in the direction B from the front surface 61*b* and the rear surface 61*c* of the first end plate 61, and also opens at the outer end surface of the first end plate 61 in the direction A. The first filling port 125 has a function of allowing filling of the aforementioned packing 120 into the first end plate 61 at the boundary portion between the lower end portion of each upper extension seal portion 105 and the upper end portion of the connection seal portion 108, and at the boundary portion between the upper end portion of each lower extension seal portion 106 and the lower end portion of the connection seal portion 108.

As shown in FIG. 4, in the second end plate 62, a second filling port 126 is formed at a position in the direction C corresponding to the boundary portion between the respective extension seal portions 105 and 106 and the connection seal portion 108. The second filling port 126 allows the inside and the outside of the second connection groove 119 to communicate with each other. In this embodiment, the second filling ports 126 are located at both end portions of the second connection groove 119 in the direction C, respectively. The second filling ports 126 are recessed inside in the direction B from the front surface 62*b* and the rear surface 62*c* of the second end plate 62 and also open at the outer end surface in the direction A of the second end plate 62. The second filling port 126 has a function of allowing filling of the aforementioned packing 120 into the second end plate 62, at the boundary portion between the lower end portion of each upper extension seal portion 105 and the upper end portion of the connection seal portion 108, and at the boundary portion between the upper end portion of each lower extension seal portion 106 and the lower end portion of the connection seal portion 108.

The positions of each of the filling ports 125 and 126 in the direction C may be different from that of the boundary portion between the respective extension seal portions 105 and 106 and the connection seal portion 108. The respective filling ports 125 and 126 may be formed in the front plate 65 or the rear plate 66. Each of the filling ports 125 and 126 may be closed with the packing 120.

In the above-described embodiment, the description has been given of a case where a groove is formed on one surface among the surfaces facing each other with the seal member 100 sandwiched therebetween, and the other surface is formed as a flat surface. However, the invention is not limited only to this configuration. That is, it is sufficient if the seal member 100 is sandwiched between surfaces facing each other with the seal member 100 sandwiched therebetween. Grooves may be formed on both surfaces facing each other with the seal member 100 interposed therebetween. In this case, the total depth of each groove is preferably less than the thickness of the seal member 100. Further, both the surfaces facing each other with the seal member 100 sandwiched therebetween may be flat surfaces.

In the fuel cell stack 1 of this embodiment, in order to assemble the casing 4 to the cell stacked body 3, the end plates 61 and 62 and the coupling bars 63 and 64 are first fastened to each other. Subsequently, after the seal member 100 is housed in each of the housing grooves 112, and 117 to 119, the plates 61, 62, and 65 to 68 are fastened to each other. As a result, the casing 4 is assembled between the end plates 61 and 62 and the side panels 60, and between the respective plates 65 to 68 of the side panels 60, with the seal members 100 interposed therebetween.

In this way, this embodiment has a configuration in which the seal members 100 are interposed between the end plates 61 and 62 and the side panels 60, and between the respective plates 65 through 68 of the side panels 60.

According to this configuration, it is possible to improve the sealing properties of the casing 4, and to prevent leakage of the reaction gas outside of the fuel cell stack 1.

Here, this embodiment has a configuration in which the extension seal portions 105 and 106 are formed integrally with the frame seal portions 101 and 102.

According to this configuration, the extension seal portions 105 and 106 are disposed so as to straddle the boundary portion between the lower surface 111 of the upper plate 67 and the upper frame surface 110, or the boundary portion between the upper surface 116 of the lower plate 68 and the lower frame surface 115. That is, it is possible to shift the positions of the boundary portion between the plates, and the connecting portion of the seal member 100 (the boundary portion between the extension seals 105 and 106 and the connection seal portion 108). Therefore, it is possible to prevent the reaction gas from leaking outside through the connecting portion of the seal members 100.

In this embodiment, since the seal member 100 is housed in each of the housing grooves 112, and 117 to 119, displacement of the seal member 100 can be suppressed. Therefore, the seal member 100 can be disposed at a desired position, and the sealing properties can be secured.

This embodiment is configured such that filling ports 125 and 126 communicating with the inside of the connection grooves 118 and 119 are formed in the end plates 61 and 62.

According to this configuration, by filling the packing 120 into the connection grooves 118 and 119 through the filling ports 125 and 126, the extension seal portions 105 and 106 and the connection seal portion 108 can be joined by the packing 120. Therefore, it is possible to improve the sealing properties at the boundary portion between the extension seal portions 105 and 106 and the connection seal portion 108.

Since the packing 120 can be filled in after each plate is assembled, the seal members 100 can be divided into the frame seal portions 101 and 102, the extension seal portions 105 and 106, and the connection seal portion 108. Accordingly, it is possible to improve the assembling efficiency as compared with the case of assembling integrally formed seal members 100.

This embodiment is configured such that the extension seal portions 105 and 106 are formed at positions avoiding the corner portions of the frame seal portions 101 and 102.

According to this configuration, as compared with the case where the extension seal portions 105 and 106 are positioned at the corner portions, it is possible to reduce stress concentration at the boundary portion between the upper extension seal portion 105 and the upper frame seal portion 101, and at the boundary portion between the lower extension seal 106 and the lower frame seal portion 102. As a result, it is possible to suppress the rupture or the like of the extension seal portions 105 and 106 and improve the durability.

Further, the technical scope of the present invention is not limited to each of the embodiments described above, and includes various modifications to the above-described embodiments within the scope that does not depart from the spirit of the present invention.

For example, in the above-described embodiment, the configuration in which the frame seal portions 101 and 102 are disposed along the outer circumferential portions of the upper plate 67 and the lower plate 68 has been described, but the present invention is not limited to this configuration. The frame seal portion may be disposed along the outer circumferential portion of any plate (for example, the end plates 61 and 62) facing each other in each direction.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fuel cell stack comprising:
    a cell stacked body in which a plurality of fuel cells are stacked;
    a casing which is formed by a combination of a plurality of plates and houses the cell stacked body; and
    a seal member interposed between the plurality of plates,
    wherein the plurality of plates includes:
        a pair of first plates comprising a first plate wherein the pair of first plates facing each other in a first direction with the cell stacked body interposed therebetween,
        a pair of second plates comprising a second plate wherein the pair of second plates facing each other in a second direction orthogonal to the first direction with the cell stacked body interposed therebetween and is a direction that the plurality of the fuel cells are stacked, and
        a pair of third plates comprising a third plate wherein the pair of third plates facing each other in a third direction orthogonal to the first direction and the second direction with the cell stacked body interposed therebetween, and
    wherein the seal member has:
        an upper frame seal portion and a lower frame seal portion which are formed in a frame shape extending to follow an outer circumferential portion of the first plate, and is sandwiched between the first plate and the second plate and between the first plate and the third plate in the first direction,
        an upper extension seal portion which extends downward in the first direction integrally with the upper frame seal portion, and is sandwiched between the second plate and the third plate,
        a lower extension seal portion which extends upward in the first direction integrally with the lower frame seal portion, and is sandwiched between the second plate and the third plate, and
        a connection seal portion which extends between the second plate and the third plate in the first direction, and is close to or in contact with a lower end portion of the upper extension seal portion and an upper end portion of the lower extension seal portion between the upper extension seal portion and the lower extension seal portion facing each other in the first direction, and wherein:
the upper frame seal portion and the lower frame seal portion are housed in a first housing groove formed on a surface of the second plate and the third plate which face the first plate,
the upper extension seal portion and the lower extension seal portion, and the connection seal portion are housed in a second housing groove formed on a surface of the second plate facing the third plate,
the upper extension seal portion and the lower extension seal portion, and the connection seal portion are arranged in a state of being joined by liquid packing, and
at least one of the second plate and the third plate has a filling port for the liquid packing formed on the outside of the casing therein which communicates with the inside of the second housing groove.

2. The fuel cell stack according to claim 1, wherein
the upper frame seal portion and the lower frame seal portion formed in a rectangular shape when seen from the first direction, and
the upper extension seal portion and the lower extension seal portion are formed at a position avoiding a corner portion of the upper frame seal portion and the lower frame seal portion.

* * * * *